United States Patent Office 3,787,591
Patented Jan. 22, 1974

3,787,591
PROCESS FOR PRODUCING POWDERS OF GREEN LEAVES OF WHEAT AND BARLEY
Yoshihide Hagiwara, Takarazuka, Japan, assignor to Japan Natural Food Co., Ltd., Osaka, Japan
No Drawing. Filed Sept. 16, 1971, Ser. No. 181,196
Int. Cl. A23l 1/00
U.S. Cl. 426—373    4 Claims

ABSTRACT OF THE DISCLOSURE

Green juice is obtained by mechanically pulverizing the green leaves of barley or wheat in the pre-ripe stage. Course solid materials are removed from the juice and the pH is adjusted to 6.5 to 7.5. The treated juice is then spray dried or lyophilized to a powder. The powder can be incorporated into various foods and beverages and is a source of various proteins, vitamins, and minerals.

---

This invention relates to a process for producing powders of green leaves of wheat and barley. More specifically, the invention relates to a process for producing powders of green leaves of wheat and barley useful for drinks and foodstuffs (the term meant to include liquors or other luxuries), or medicines (the term meant to include health-keeping drugs and cosmetics), which comprises mechanically pulverizing the green leaves (green stems and leaves) of wheat and barley in the pre-ripe stage, preferably in the tillering stage to the heading stage, advantageously barley or Italian rye grass, separating coarse solid matters from the pulverized product to form green juice, adjusting the pH of the green juice to 6–9, preferably 6.5–8.5, and spray drying or lyophilizing the neutralized green juice.

There has been no proposal previously in which green leaves of wheat and barley are taken directly into the human body or applied to the human skin as foodstuffs or medicines.

It has previously been proposed that a green juice obtained by mechanical treatment, such as by home mixers or juicers of green edible vegetables and field grasses, for instance, spinach or confree leaves is good for health. It was also proposed that the powders obtained by drying the leaves of confree or bamboo grass and then pulverizing them are useful for health.

These juices or powders have the common defects of browning, degeneration, or unsuitable flavor. It is also doubtful whether chlorophyll and other active ingredients in the cells of these plants covered with cell membranes are absorbed by the intestine. It is easily imaginable that if such juices or powders are difficult to digest substantially, the active ingredients in the cells will be discharged mostly out of the body in the form enclosed by cell membranes without being digested.

In this connection, the inventor of the present application measured the digestable protein in the crude protein present in the powders of naked barley green leaves obtained by spray drying according to the process of the present invention, the leaves of the naked barley having been taken before the growth of internodes (height of about 20 cm.) (see Note 1). The digestable protein was also measured in the same way as to lyophilized powders of low, striped bamboo (Sasa albo-marginata) and lyophilized powders of chlorella. The results shown in Table 1 below were obtained.

TABLE 1

| Samples: | Digestable protein in crude protein (percent by weight) |
|---|---|
| Powders of green leaves of naked barley (invention) | 31.12 |
| Powders of striped bamboo | 11.03 |
| Chlorella powders | 0.00 |

Note 1.—Testing method for digestable protein: About 2 g. of the sample were accurately taken in a 300 ml. three-necked flask. 50 ml. of distilled water were added, and then 20 ml. of 1 N HCl were added. The mixture was stirred, and a solution of 1 g. of pepsin in 50 ml. of distilled water was added. Then 80 ml. of distilled water were poured in a manner to rinse the walls of the flask. The flask was put in a constant temperature vessel, and with occasional stirring, the sample was decomposed for 44 hours. After completion of the decomposition, the decomposition product was filtered, and the nitrogen content of the residue was measured by the Kjeldahl method.

It is seen from the results given in Table 1 that the powder of barley produced according to the present invention has a digestable protein content about 3 times as much as that of the striped bamboo powder, and substantially all of the protein contained in the chlorella powder is not digestable.

It has been found that green leaf powders having a vivid green color and containing useful natural ingredients which are excellent as drinks and foodstuffs or medicines either directly or as additives can be obtained by spray-drying or lyophilizing a neutralized green juice extracted from the green leaves of wheat and barley, preferably, barley, wheat, naked barley, oats, or Italian rye grass, which have not been heretofore proposed as utilizable plant sources in the production of dry powders of green leaves or green juices.

It is well known that edible vegetables, when taken raw, have far higher nutritive values than when they are cooked by heating prior to eating and by heating, such ingredients as digestable nutrients, vitamins, or minerals are markedly reduced. Minerals, or vitamins contained in natural fresh vegetables are organically bonded with proteins, amino acids, chlorophyll, or enzymes, and can be readily assimilated. From this standpoint, it is desirable to eat vegetables raw. The green leaves of wheat and barley, probably because of their high fiber content, have been utilized only for animal feed, and have not been considered edible by man.

According to the present invention, the green leaves are made into powders while these ingredients are contained within the plant body; therefore, a wide variety of natural vitamins and minerals are contained in the form readily assimilated by the human body and exhibit excellent in vivo absorbing characteristics.

Tests were conducted as to the absorption of minerals by the intestinal tract using the green powders (spray dried products) of the present invention produced from naked barley at the ear premordia stage (height of about 20 cm.), ear sprouting stage (height of about 45 cm.), and heading stage (height of about 60 cm.) (see Note 2). The results are shown in Table 2 below.

TABLE 2

| Sample | Absorption rate percent of— | |
|---|---|---|
| | Ca | K |
| Powders of naked barley at the ear premordia stage | 12.3 | 75.7 |
| Powders of naked barley at the ear sprouting stage | 12.2 | 88.9 |
| Powders of naked barley at the heading stage | 13.6 | 70.0 |

Note 2.—Intestinal tract absorption rate test: 200 mg. of the sample powder were accurately weighed, and dissolved in 4 ml. of isotonic sodium chloride solution (partly dispersed). Two ml. of the solution were incorporated in the intestinal tract (20 cm. from the stomach pyloric region) of a male rat, and the intestinal tract was immersed in 20 ml. of isotonic sodium chloride solution. It was incubated with shaking at 37° C. for one hour while passing $O_2$. After incubation, the solution was filtered, and the filtrate was diluted (Ca, three times; K, 80 times). It was compared with the standard solution, and the measurement was made by using an atomic absorptiometer (product of Hitachi Limited, Japan).

It is seen from the results shown in Table 2 that the powders obtained in accordance with the present invention have good intestinal tract absorption rate of minerals (Ca and K).

Furthermore, the powders of green leaves of barley and wheat obtained by the process of the present invention contain a wide variety of useful natural ingredients. For instance, the powders contain as much as 1000 to 1600 mg. percent (per 100 grams) of chlorophyll useful as a skin nourishing and pharmaceutically effective substance without conversion to another form, and furthermore, 10–15 mg. percent of nicotinic acid and 100–200 mg. percent of choline which have similar utility. It has been found further that essential fatty acids which are well known as having similar utility and are not synthesized within the human body, such as linoleic acid or linolenic acid, account for more than half of the total amount of the fatty acids contained.

Examples of the contents of a variety of such useful substances which have been measured using several kinds of powders of green leaves of barley obtained by the process of the invention are shown in the following Table 3.

TABLE 3

| General composition: | Percent by weight |
|---|---|
| Crude protein | 20–50 |
| Crude fat | 3–5 |
| Glucide | 20–60 |
| Crude fiber | 0.1–0.3 |
| Crude ash content | 10–25 |
| Moisture content | 3 or less |

The contents of vitamins, vitamin precursors, and other skin-nourishing and pharmaceutical effective substances contained per 100 g. of the product are shown in Table 4 below.

TABLE 4

| | |
|---|---|
| Vitamin $B_1$ | 1–2 mg. percent. |
| Vitamin $B_2$ | 2–4 mg. percent. |
| Vitamin C | 35–120 mg. percent. |
| Vitamin $B_6$ | 0.3–1 mg. percent. |
| Panthothenic acid | 2–4 mg. percent. |
| Folic acid | 0.3–1 mg. percent. |
| Carotene | 20–45 mg. percent. |
| Vitamin H (biotin) | 20–55 $\gamma$ percent. |
| Vitamin E | 30–55 mg. percent. |
| Xanthophyll | 100–110 mg. percent. |
| Chlorophyll | 1000–1600 mg. percent. |
| Niacin (nicotinic acid) | 10–15 mg. percent. |
| Choline | 100–200 mg. percent. |
| Minerals | 10–15% (sum of Ca, P, K, Fe, Ni, Mn, Co, Zn, Cu, Mg). |
| Linoleic acid (in the fat) | 8–10%. |
| Linoleic acid (in the fat) | 45–55%. |

Table 5 below is a food composition table which shows excellent suitability of one example of the green juice powder obtained by the process of the present invention as a food. It is seen from the table that the green juice powder contains high degrees of effective ingredients as compared with the other foodstuffs, which has not been expected heretofore.

TABLE 5.—FOOD COMPOSITION TABLE

| Foodstuffs | Rate of discarding | Amount of heat cal. | Moisture content | Protein | Fat | Carbohydrate | |
|---|---|---|---|---|---|---|---|
| | | | | | | Glucide | Fiber |
| (A) Cereal grains: | | | | | | | |
| A-1 | 0 | 339 | 10.5 | 10.1 | 1.9 | 74.0 | 2.0 |
| A-2 | 0 | 350 | 13.9 | 11.2 | 1.5 | 77.5 | |
| A-3 | 0 | 361 | 11.7 | 6.2 | 1.0 | 86.8 | |
| A-4 | 0 | 122 | 69.9 | 2.1 | 0.3 | 29.6 | |
| A-5 | 0 | 337 | 14.0 | 8.8 | 0.9 | 74.7 | 0.7 |
| (B) Fish and milk: | | | | | | | |
| B-1 | 0 | 59 | 88.6 | 2.9 | 3.3 | 4.5 | 0 |
| B-2 | 0 | 137 | 71.2 | 20.5 | 5.4 | 0.3 | 0 |
| (C) Fruits: | | | | | | | |
| C-1 | 33 | 87 | 75.5 | 1.3 | 0.4 | 21.4 | 0.5 |
| C-2 | 18 | 45 | 87.9 | 0.4 | 0.5 | 10.4 | 0.6 |
| C-3 | 30 | 40 | 88.9 | 0.8 | 3.3 | 9.3 | 0.3 |
| C-4 | 0 | 193 | 46.3 | 0.4 | 0.2 | 52.6 | 0.2 |
| (D) Vegetables: | | | | | | | |
| D-1 | 40 | 20 | 93.0 | 0.7 | 1.0 | 4.0 | 1.0 |
| D-2 | 5 | 14 | 95.4 | 1.0 | 0.2 | 2.4 | 0.5 |
| D-3 | 0 | 28 | 90.2 | 3.0 | 0.4 | 3.9 | 0.9 |
| D-4 | 10 | 40 | 89.1 | 1.2 | 0.2 | 8.3 | 0.7 |
| D-5 | 5 | 33 | 90.5 | 1.3 | 0.3 | 6.9 | 0.4 |
| D-6 | 15 | 24 | 92.3 | 1.6 | 0.2 | 4.4 | 0.8 |
| D-7 | | 40 | | 3.9 | 0.6 | 7.2 | |
| D-8 | | | 91.1 | 2.0 | 0.3 | 3.5 | |
| (E) Powders of wheat and barley (invention) | 0 | 302 | 69.6 | 45.19 | 3.18 | 23.19 | 0.14 |
| (F) Drinks: | | | | | | | |
| F-1 | 0 | 176 | 65.0 | 4.0 | 8.5 | 21.8 | 0 |
| F-2 | 0 | | 98.7 | 0.7 | 0.3 | | 0 |
| F-3 | 0 | 359 | 4.2 | 34.8 | 1.0 | 52.2 | 0 |
| (G) Processed goods: | | | | | | | |
| G-1 | 0 | 578 | 9.5 | 42.6 | 43.5 | | 0 |
| G-2 | 0 | 571 | 4.5 | 26.3 | 48.2 | 17.0 | 1.7 |
| G-3 | 0 | 562 | 4.2 | 3.6 | 43.8 | 45.0 | 0.9 |
| G-4 | 0 | 436 | 10.4 | 53.4 | 26.4 | 7.0 | 0.2 |
| G-5 | 0 | 43 | 86.9 | 1.9 | 0.4 | 8.1 | |

TABLE 5—Continued

| Foodstuffs | Minerals, amount per 100 g. of the edible portion (mg.) of— | | | | | | | | |
|---|---|---|---|---|---|---|---|---|---|
| | Na | K | Ca | Mg | Fe | Cu | P | Mn | Zn |
| (A) Cereal grains: | | | | | | | | | |
| (A-1) | 3.4 | 361 | 30 | 106.0 | 3.2 | 0.65 | 330 | | |
| (A-2) | 2.7 | 132 | (118) | 34.1 | (1.93) | 0.17 | 111 | | |
| (A-3) | 6.3 | 113 | 3.7 | 13.1 | 0.45 | 0.06 | 99 | | |
| (A-4) | 2.2 | 38 | 1.3 | 4.4 | 0.16 | 0.02 | 34 | | |
| (A-5) | 3 | | 2.4 | | 1.5 | | 140 | | |
| (B) Fish and milk: | | | | | | | | | |
| (B-1) | 36 | 160 | 100 | 14.0 | 0.1 | 0.02 | 90 | | |
| (B-2) | 500 | 320 | 170 | 29.8 | 1.2 | 0.05 | 320 | | |
| (C) Fruits: | | | | | | | | | |
| (C-1) | 8 | 348 | 5 | 41.9 | 0.4 | 0.16 | 23 | | |
| (C-2) | 2 | | 3 | | 0.2 | | 7 | | |
| (C-3) | 4 | | 14 | | 0.2 | | 12 | | |
| (C-4) | | | | | | | | | |
| (D) Vegetables: | | | | | | | | | |
| (D-1) | 28 | 278 | 37 | 9.6 | 1.4 | 0.11 | 45 | | |
| (D-2) | 30 | 208 | 21 | 9.7 | 0.5 | 0.15 | 25 | | |
| (D-3) | 25 | 490 | 98 | 59.2 | 3.3 | 0.26 | 52 | | |
| (D-4) | 10 | 137 | 40 | 7.6 | 0.5 | 0.08 | 26 | | |
| (D-5) | 3 | 288 | 3 | 11.0 | 0.2 | 0.10 | 18 | | |
| (D-6) | 15 | 240 | 45 | 16.8 | 0.4 | | 22 | | |
| (D-7) | | | 225 | | | | 67 | | |
| (D-8) | | | | | | | | | |
| (E) Powders of wheat and barley (invention) | 775.0 | 8880 | 717.9 | 224.7 | 15.8 | 1.36 | 594.3 | 5.6 | 7.33 |
| (F) Drinks: | | | | | | | | | |
| (F-1) | 50 | | 120 | | 0.1 | | 110 | | |
| (F-2) | 1 | 88 | 5 | 8.3 | 0.2 | | 8 | | |
| (F-3) | 470 | 1335 | 1200 | 111.0 | 1.0 | 1.39 | 980 | | |
| (G) Processed goods: | | | | | | | | | |
| (G-1) | 350 | 483 | | 41.4 | | 0.18 | | | |
| (G-2) | 3 | 680 | 57 | 181.0 | 1.9 | 0.27 | 380 | | |
| (G-3) | | | 18 | | 1.6 | | 74 | | |
| (G-4) | 18 | | 590 | | 9.4 | | 710 | | |
| (G-5) | | 189 | 20.5 | 12.1 | 0.44 | 0.13 | 41.2 | | |

| Foodstuffs | Vitamins and other ingredients (per 100 g.) of— | | | | | | | | | | | | Acidity and alkalinity (per 100 g.) | |
|---|---|---|---|---|---|---|---|---|---|---|---|---|---|---|
| | Carotene (I.U.) | VB$_1$ (mg.) | VB$_2$ (mg.) | VB$_6$ (mg.) | VC (mg.) | VE (mg.) | VH (biotin) ($\gamma$) | Folic acid ($\gamma$) | Pantothenic acid (mg.) | Nicotinic acid (mg.) | Chlorophyll (mg.) | Choline (mg.) | Acidity | Alkalinity |
| (A) Cereal grains: | | | | | | | | | | | | | | |
| A-1 | 0 | 0.30 | 10.0 | 0.4 | 0 | 2.6 | 5.0 | 35 | 1.5 | 4.5 | | | | |
| A-2 | | | | 0.1 | | 1.7 | 0.6 | 14 | 0.8 | | | | | |
| A-3 | | | | 0.3 | | 0.4 | 3.0 | 10 | 0.6 | | | | 7.6 | |
| A-4 | | | | | | | | | | | | | 2.6 | |
| A-5 | 0 | 0.18 | 0.07 | | 0 | | | | | 2.5 | | | | |
| (B) Fish and milk: | | | | | | | | | | | | | | |
| B-1 | 20 | 0.04 | 0.15 | 0.04 | 2 | | 2.0 | 0.3 | 0.35 | 0.2 | | | | 2.7 |
| B-2 | 0 | 0.02 | 0.12 | 0.3 | 0 | | 10.0 | 5 | 0.50 | 7.0 | | | 20.1 | |
| (C) Fruits: | | | | | | | | | | | | | | |
| C-1 | 200 | 0.03 | 0.05 | 0.3 | 10 | 0.4 | | 10 | 0.20 | 0.5 | | | | 7.9 |
| C-2 | 45 | 0.01 | 0.10 | | 5 | | | | | 0.1 | | | | |
| C-3 | 120 | 0.09 | 0.02 | | 50 | | | | | 1.0 | | | 4.5 | |
| C-4 | 0 | 0 | 0 | | 3 | | | | | 1.0 | | | | |
| (D) Vegetables: | | | | | | | | | | | | | | |
| D-1 | 20 | 1.03 | 1.02 | 0.10 | 10 | 0.5 | 0.1 | 7 | 0.40 | 0.4 | | | | 8.4 |
| D-2 | 200 | 0.06 | 0.06 | 0.07 | 5 | 0.5 | 0.7 | 20 | 0.10 | 0.2 | | | | 3.8 |
| D-3 | 8,000 | 0.12 | 0.30 | 0.10 | 100 | | 0.1 | 80 | 0.30 | 1.0 | | | | 39.6 |
| D-4 | 20 | 0.03 | 0.02 | 0.10 | 10 | 0.3 | 0.9 | 10 | 0.10 | 0.2 | | | | 0.5 |
| D-5 | 400 | 0.08 | 0.03 | 0.10 | 20 | 0.4 | 1.2 | 5 | 0.05 | 0.8 | | | | 5.6 |
| D-6 | 100 | 0.08 | 0.05 | | 50 | | | | | 0.5 | | | | 2.7 |
| D-7 | | 0.15 | 0.325 | | 125.5 | | | | | | | | | |
| D-8 | | | | | | | | | | | | | | |
| (E) Powders of wheat and barley (invention) | 52,000 | 1.29 | 2.75 | 0.34 | 36.3 | 51.0 | 48.0 | 640 | 2.48 | 10.6 | 1,490 | 160 | | 66.4 |
| (F) Drinks: | | | | | | | | | | | | | | |
| F-1 | 20 | 0.05 | 0.20 | | 0 | | | | | 0.1 | | | | |
| F-2 | 0 | 0 | 0 | | 0 | | | | | 1.2 | | | | |
| F-3 | 0 | 0.30 | 1.60 | | 5 | | | | | 1.1 | | | | 14.5 |
| (G) Processed goods: | | | | | | | | | | | | | | |
| G-1 | 50 | 0.35 | 1.20 | | 0 | | | | | 0.2 | | | 59.8 | |
| G-2 | 0 | 0.20 | 0.08 | | 0 | | | | | 12.0 | | | 11.6 | |
| G-3 | 0 | 0 | 0.02 | | 0 | | | | | 0.5 | | | | |
| G-4 | 0 | 0.05 | 0.04 | | 0 | | | | | 0.6 | | | | |
| G-5 | | | | | | | | | | | | | | |

NOTE:
A-1 = Wheat flour (wholly powders of grain).
A-2 = Mixed wheat flour (white color).
A-3 = Rice without bran (raw).
A-4 = Boiled rice without bran.
A-5 = Flattened wheat.
B-1 = Cow milk (wholly milk, raw).
B-2 = Salmon (canned).
C-1 = Banana (raw).
C-2 = Apple (raw).
C-3 = Orange (raw).
C-4 = Orange (conc. juice).
D-1 = Celery (raw).
D-2 = Lettuce (raw).
D-3 = Spinach (raw).
D-4 = Onion (raw).
D-5 = Tomato (raw).
D-6 = Cabbage (raw).
D-7 = Kale (raw).
D-8 = Confree (raw).
F-1 = Ice cream (high fat).
F-2 = Coffee (exuded liquid) 12 grams of powders were exuded in 180 cc. of hot water for 3 minutes.
F-3 = Defatted milk.
G-1 = Dried egg.
G-2 = Peanut.
G-3 = Fried potato chips.
G-4 = Soybean curd.
G-5 = Vegetable soup (canned).

Accordingly, an object of the present invention is to provide a process for producing the powders of juice of fresh green leaves of wheat and barley, preferably barley, wheat, naked barley, oats, or Italian rye grass, which contain a variety of naturally occurring useful ingredients suited for foods and medicines in the form readily assimilable by the human body and do not suffer from browning and degeneration.

The plants used as a raw material in the present invention are barley and wheat, preferably barley and naked barley, and the green leaves (green parts above the ground such as leaves and stems) before the full ripe stage. Barley and naked barley are especially preferred because they have an abundance of green leaves and can be cultivated with easy care, they contain an abundance of useful components, a relatively large amount of green juice is obtained from the green leaves, and they are superior in taste to Italian rye grass and other gramineae grasses. In the present invention, leguminous forage grasses such as clover, or alfalfa can also be used together with the barley and wheat by being treated in the presence or absence of the latter.

Generally, about 5 to 20 days after germination, the barley and wheat develop main leaves, tillering begins at this stage, and then the root cap is formed. After terminating of the tillering stage and subsequent differentiation of young ears (young ear forming stage), internodes grow (internode growing stage), and the number of leaves increases. At the time when the number of leaves becomes maximum, the leaves stop growing (leaf stopping stage), and the head comes out. Before or after the beginning of the internode growing stage, the nutritive growth period of wheat and barley ends, and they enter the reproductive stage. The head usually grows over a period of about 10 days (about 70% or more of heads come out), and a full head stage is reached through the head initiation stage and the heading stage. Flowering begins about the heading stage. Flowering stage usually sets in about 25 days from the beginning of flowering. During this period, fertilization occurs, and through an early ripe stage, the wheat and barley will be fully ripened. Generally, the plants gradually turn yellow during the flowering stage to the ripe stage, and lose their green color. When the ripe stage is reached, the plants substantially fully turn yellow.

It should be noted that the term pre-ripe stage refers to the growing stage before such substantial yellowing of the plants. This period is usually about 20 days after the full head stage, but varies according to the growing condition of barley and wheat, the soil texture, climate, fertilization, the cultivation area, or the like.

According to the process of the present invention, green leaves of barley and wheat in the pre-ripe stage as defined above, preferably the full head stage or before, more preferably the heading initiation stage, and before this stage, especially preferably the tiller beginning stage to the heading initiation stage are used as the material.

When the leaves of barley and wheat are ripened substantially and turn yellow, they become too hard to be suitable for extraction of green juice. Furthermore, at such a stage, chlorophyll is lost, and it is impossible to obtain green juice. Crude protein content decreases to about half of that immediately before the beginning of heading, and the content of digestable protein in the crude protein is reduced to less than half. The digestable protein content in the resulting powder decreases to about ¼ of that immediately before the beginning of heading. There are also substantial decreases in choline, vitamins, and minerals.

Changes in composition were tested with respect to spray dried powders obtained from juices from naked barley at the respective growing stages, and the ripe stage. The results are given in Table 6 below.

The use of green leaves in the pre-ripe stage where the leaves maintain substantially green color is necessary not only for the operation of extracting green juice, but also for obtaining green juice containing large amounts of a variety of excellent naturally occurring useful components.

In order to obtain powders of green juice with commercial advantage, it is desirable to obtain naturally occurring useful components such as digestable protein, minerals, vitamins, or choline in the best yields per unit area of cultivation of barley and wheat. Investigation of the present inventor reveals that although there are some changes depending upon the kind of wheat and barley, cultivation conditions, climate, etc., the yields of green leaves of barley and wheat per unit area of cultivation gradually increase after the beginning of tillering, and abruptly increase in the young head forming stage. This great increase continues until the heading stage and the full heading stage. Thereafter, they remain unchanged, until the ripe stage where it is no longer possible to extract green juices from green leaves of the plants. The contents of the useful components listed for example in Table 6 will be reduced. On the other hand, the crude protein content in the green leaves decreases gradually from the young head forming stage, and in the later stage of heading in which flowering partly occurs, the protein content decreases to about 60% of that before the young head forming stage, as shown in Table 6. The digestable protein in the crude protein also decreases to about 60%, and therefore, the digestable protein is substantially decreased to about 36%. Other useful components such as minerals, vitamins, or cholines, although to varying degrees, decrease gradually. These components abruptly decrease at the full ripe stage.

Accordingly, there is a proper time of collecting the green leaves of wheat and barley in order to obtain these useful components advantageously in good yields per unit area of cultivation. The utilization of green leaves before the full heading stage is preferred, and more preferably, the green leaves should be collected at the beginning of heading and before this stage. Especially preferred is the utilization of green leaves at the beginning of tillering and before the beginning of heading.

The above-mentioned tendency is common to barley and wheat, although to varying degrees. At a stage where there is substantial yellowing of plants (in the late stage of the flowering stage and the ripe stage), the yield of crude protein, especially digestable protein, per unit area of cultivation is considerably decreased. There is also a substantial reduction in the yields of vitamins, minerals, or cholines, and it becomes impossible to extract green juice. Considering barley as an example, the yield of digestable protein per area and the composition of the spray-dried products and the leaves and stems of barley at the early ripe stage and a stage immediately before

TABLE 6

| Samples | Powders of green juice— | | | Powders of juice at the ripe stage (excepting heads at the ripe stage) (ca. 90 cm. high) |
| --- | --- | --- | --- | --- |
|  | At the beginning of young head formation ca. 20 cm. high) | Immediately before the beginning of heading (ca. 45 cm.) | In the full heading stage (partly flowering; ca. 60 cm. high) |  |
| Moisture content (wt. percent) | 10.08 | 8.38 | 8.87 | 10.2 |
| Crude protein (wt. percent) | 33.64 | 27.90 | 20.34 | 15.5 |
| Crude fat (wt. percent) | 0.61 | 1.88 | 0.67 | 2.3 |
| Soluble non-nitrogenous matter (wt. percent) | 38.88 | 48.25 | 57.77 | 60.2 |
| Crude fiber (wt. percent) | 0.97 | 1.57 | 1.13 | 1.3 |
| Crude ash content (wt. percent) | 15.80 | 12.02 | 11.22 | 10.5 |
| Digestable protein in crude protein (wt. percent) | 31.12 | 25.99 | 18.49 | 11.45 |
| Reducing-type vitamin C in soluble non-nitrogenous matter (mg. percent in 100 g.) | 328.8 | 140.5 | 123.5 | 75.5 |
| Ca in crude ash (mg. percent per 100 g.) | 1,108.02 | 851.91 | 691.50 | 650.40 |
| Choline in sample (wt. percent) | 0.26 | 0.19 | 0.17 | 0.12 |

[1] Leaves and stems completely yellowed.

the beginning of heading were examined, and the results are given in Tables 7 and 8 below.

TABLE 7.—LEAVES AND STEMS

| Kind | Stage | Components (percent) | | | | | | Digestible crude protein |
|---|---|---|---|---|---|---|---|---|
| | | Moisture | Fiber | Fat | Glucide | Protein | Ash | |
| Barley | Immediately before the beginning of heading | 82.1 | 5.3 | 0.8 | 6.4 | 3.3 | 2.1 | 2.2 |
| | Early ripe stage | 77.20 | 7.3 | 0.9 | 10.5 | 2.2 | 1.9 | 1.8 |

TABLE 8.—SPRAY-DRIED PRODUCT

| Kind | Stage | Components (percent) | | | | | | Digestible crude protein in protein | Yield of digestible protein per acre, kg. |
|---|---|---|---|---|---|---|---|---|---|
| | | Moisture | Fiber | Fat | Glucide | Protein | Ash | | |
| Barley | Immediately before the beginning of heading | 8.90 | 0.13 | 2.2 | 45.43 | 27.51 | 15.83 | 30.17 | 95.44 |
| | Early ripe stage | 8.63 | 0.38 | 2.3 | 61.34 | 16.72 | 11.62 | 17.55 | 78.73 |

NOTE.—In Table 8, the changes of the fiber content are not shown, because the fibers were removed at the time of taking green juice.

It is desired that in the process of the present invention, the green leaves of barley and wheat in the pre-ripe stage should be treated while they are as raw and fresh as possible. If desired, stored leaves may be used, but these leaves should be subjected to discoloration and degeneration preventing means such as storage in inert gases, storage at low temperatures, storage after dehydration at reduced pressure, or storage after treatment with sulfurous acid gas or sulfite.

The green leaves employed as raw material are thoroughly washed with water to remove any adhering materials. If desired, they are sterilized with a germicide such as hypochlorous acid, and further washed fully with water. The washed material is then cut to proper lengths for convenience by mechanically pulverizing it by means such as mixers. If roll squeezing type juicers are used, it is not necessary to cut the material in small pieces in advance. When slices of the material are used, the material may be immersed in a dilute (for example, 0–1–2%) saline solution before or after slicing into small pieces, and then used after removing water. Where the material is used without slicing, it may also be immersed in dilute saline solution before use.

In the course of the above pre-treatment steps, the material may, if desired, be blanched, and then rapidly cooled before use. Preferably, the blanching treatment should be carried out at high temperatures for short periods of time, for example, at 100–140° C. for 2–10 seconds. The blanching treatment may also be performed at reduced or elevated pressure. This treatment serves to inactivate enzymes, such as chlorophylase, peroxides, or polyphenoloxidase, which constitute one cause of the undesirable discoloration and degeneration of the green leaves of the barley and wheat.

A suitable amount of water may, if desired, be added to the pretreated green leaves of the plants, before they are mechanically pulverized by suitable means such as mixers or juicers. If desired, the material may be pulverized without addition of water, and after pulverization, a suitable amount of water may be added.

Coarse solid matters consisting mainly of fibers are separated and removed from the resulting mechanically pulverized product. The separation may be performed by any means for liquid-solid separation.

The resulting green juice has a peculiar green smell, and even when made into powders, immediately turns brown and has an offensive odor. Thus, without treatment, the juice is exceedingly unstable, and unsuitable for drinking or eating. The suitability can however be improved by neutralizing it to a pH 6.0–9.0, preferably pH 6.5–8.5, more preferably pH 6.5–7.5, and then spray drying or lyophilyzing it, preferably spray drying it. By this treatment, powders of green juice of barley and wheat can be obtained which contain an abundance of minerals, vitamins, vitamin precursors, chlorophyll, choline, linoleic acid, linolenic acid, etc. in the form readily digestable and retain their fresh green color and also have good stability. If the pH of the juice shifts to the alkaline side beyond the above-mentioned range, chlorophyll changes to chlorophyllin and is thus stabilized, but the taste of the resulting green juice becomes bad. If on the other hand, the pH of the juice shifts to the acidity side beyond the above-specified range, browning tends to occur. This also constitutes a setback against the powderization of the useful components such as minerals, or vitamins. Thus, the material should be subjected to the drying step after making the above pH adjustment. In order to reduce the amount of liquid, the green juice may be spray dried after concentration. In this case, the pH adjustment is of particularly important significance. The pH adjustment is an important factor for preventing the degeneration or decomposition of chlorophyll, minerals, enzymes, protein, or fat, and obtaining excellent green juice powders intended by the present invention.

Examples of the pH controlling agent for green juice of barley and wheat include the carbonates, bicarbonates, hydroxides, and amino acid salts of alkali metals or alkaline earth metals, such as sodium carbonate, potassium carbonate, sodium bicarbonate, potassium hydroxide, ammonium hydroxide, calcium hydroxide, calcium carbonates, magnesium hydroxide, or calcium glutamate.

The coarse solid matters consisting mainly of fibrous material separated at the time of obtaining the green juice may be aged by addition of dilute acids, usually dilute hydrochloric acid, washed thoroughly with water, and then dried and powdered by any known method such as heating, hot air, freezing, or infrared rays. The so treated coarse solid matters, or such solid matters directly dried may be added to the dried product according to the present invention in order to further improve the suitability of the powder product or the solubility of the powders, or to prevent moisture absorption.

The drinking and eating suitability of the green juice powder of the invention can further be improved by adding to the green juice an emulsion of fat and protein consisting mainly of edible protein, for example, an emulsion such as cow milk, soybean milk, dry milk, or defatted milk or an emulsion consisting of a proper combination of these fats, or a mixed emulsion of fat and a soluble protein of other animal or vegetable origin in an amount, based on the dry weight of the green juice, of 5 to 200% calculated as protein in the emulsion.

Further improvement can be expected by adding in addition to such emulsion, phosphoric acid salts or polyphosphoric acid salts, such as ammonium phosphate, di-ammonium phosphate, potassium phosphate, dipotassium phosphate, tripotassium phosphate, preferably sodium phosphate, disodium phosphate, trisodium phosphate, sodium polyphosphate, sodium metaphosphate, sodium pyrophosphate, potassium polyphosphate, potassium metaphosphate, or potassium pyrophosphate. In the process of the present invention, undesirable enzymes which cause discoloration and degeneration can be decomposed or inactivated, and at the same time, the sterilization of bacteria can also be performed, by instantaneously heating the green juice in any desired stage after the extraction of green juice but before the drying treatment, such as before, during and after the preparation of green juice to be spray-dried or lyophylized.

This treatment can be performed at normal, reduced or elevated pressures. For example, the treatment is effected at 90–150° C. for 180 to 2 seconds. After this treatment, it is especially desirable to cool the juice rapidly especially at a temperature not higher than 10° C.

In the manner mentioned above, the squeezed juice of green leaves of barley and wheat is spray-dried or lyophilyzed as rapidly as possible.

Means for spray drying or lyophylizing are of course known per se. The employment of spray drying is preferred in the present invention. Spray drying may be effected by using hot air at 120–200° C. for instance, preferably 140–170° C., or at room temperature using a suitable desiccant such as lithium chloride in dry air. In the lyophylizing operation, a dry plate having a temperature of 40–50° C. can usually be employed in a vacuum of about 1.0–0.01 mm. Hg.

If desired, discoloration and degeneration of green juice during transportation or storage may be prevented until it is subjected to a drying step, by the steps, used either alone or in combination, of replacing air with an inert gas such as nitrogen or argon, adding an oxygen absorbent such as glucoseoxidase, maintaining it at low temperatures, and shutting off light.

The concentration of green juice to be submitted to drying is usually about 1.5 to 30%, and should be as high as possible within this limit. For concentrating green juice, continuous film concentrating devices or vacuum concentration devices may be utilized.

At the time of lyophylizing or spray-drying, the following assistants may be added if desired.

Chemical preservative: Calcium sorbate.
Nutritive agents: Ascorbic acid, biotin, calcium panthothenate, chlorinated choline, magnesium oxide, niacin, chlorinated pyridoxine, sodium panthothenate, riboflavin, thiamine hydrochloride, tocopherol, vitamin A, vitamin $B_{12}$, vitamin $D_2$.
Masking agent: Sodium metaphosphate, sodium phosphate (primary, secondary, and tertiary salts), sodium pyrophosphate, sodium tripolyphosphate.
Rubbers and thickeners: Gum arabic, tragacanth, sodium aliginate, methyl cellulose, carboxymethyl cellulose, calcium alginate.
Solidification inhibitor: Calcium silicate, calciumaluminum silicate.
Chemical preservative: Benzoic acid, methyl parahydroxybenzoate, sodium benzoate.
Others: Mannitol, sorbitol, lactose, soluble starch, amino acids, glucose.

The powders of green juice obtained by the present invention contain a wide variety of useful ingredients which find wide applications in the fields of food and medicines including foodstuffs, drinks, health-keeping drugs, cosmetics, medicines, and liquors and other luxuries. For instance, the green powders of the invention can be offered for drinking directly or after blending with water, warm water, plain soda, cider, milk, or the like. Or it can be added, for example, to chewing gum base, bread, cakes, potable water, ice candies, ice creams, dairy products, soybean cruds, fermentation products, or noodles either as health-keeping drugs, nutrients, or coloring agents. It can also be added to dentifrice base, and cosmetics base as health-keeping, nutrient, or coloring agent. Furthermore, since the green powders obtained by the process of the invention contain choline, and essential fatty acids and other pharmaceutically effective substances which cannot be synthesized by the human body, they can be utilized as medicines.

If desired, table salt, sugar, bee honey, glucose, and other seasonings, or spices can also be added to the powder obtained by the invention. Other additives that can be incorporated in the green juice powder include, for example, vitamins, anti-oxidants such as d-isoascorbic acid, l-ascorbic acid, propyl gallate, butyl hydroxy anisole, or butyl hydroxy toluene, food antiseptics such as dehydroacetic acid and its sodium salt, or benzoic acid and its sodium salt, and emulsifiers such as glucose fatty acid esters, or sorbitan fatty acid esters.

The green juice powder obtained by the process of the present invention can be formed into a desired formulation such as granules, pellets, coated tablets, or capsules.

The green juice powders obtained by the invention can also be utilized in powdery or solid feeds for domestic animals, poultry, or fish by being made into a paste form.

Some embodiments of the invention will be given below together with examples of use.

EXAMPLE 1

Four kilograms of green leaves of barley (height about 20–25 cm.) immediately after tillering were reaped, and washed with Lipon F, an alkylbenzene sulfonate type surfactant, sterilized in Sarapon L, a nonionic surfactant-containing detergent, solution (3 ml.→one liter), and washed with water. Green juice was produced using a juicer, and the fibers were removed by filtration. The juice was then neutralized to a pH 7.2 with an aqueous solution of sodium bicarbonate. The resulting green juice was spray dried with hot air at 150° C. to yield 210 g. of the green juice powders.

EXAMPLE 2

Four kilograms of green leaves of naked barley (height about 35–45 cm.) in the young head forming stage were reaped, washed with Lipon F, sterilized in a Sarapon L solution (3 ml.→one liter), and thoroughly washed with water. Green juice was prepared using a juicer, and the fibers were removed by filtration. The green juice was then neutralized to a pH 7.3 with calcium glutamate, and in it 360 g. of lactose, 360 g. of defatted milk, 1 g. of l-ascorbic acid, 25 mg. of sodium sulfite, and 1.8 g. of sucrose fatty acid ester were dissolved. The solution was spray dried with hot air at 150° C. to yield 840 g. of green juice powder.

EXAMPLE 3

Green leaves of wheat having a height of about 25 cc. were reaped, washed well, and squeezed with a juicer. The fibers were removed by filtration. To 100 liters of the resulting green juice, 200 g. of sodium bicarbonate were added to adjust the pH to 7.3. The juice was concentrated to a liquid amount of about ⅓ using a continuous vacuum concentrator. Then, 5 kg. of dextrin were dissolved in the juice, freezed, and lyophilized in vacuum to yield 10.1 kg. of green powders.

EXAMPLES OF USE (1) Ice cream

| | |
|---|---|
| Defatted milk | 265 |
| Sucrose | 200 |
| Glucose | 100 |
| Green juice powder | 20 |
| Carboxymethyl cellulose | 5 |
| Spice | (¹) |
| Water | 400 |
| | 1000 |

¹ Suitable amount.

Defatted milk (265 g.) was put into 250 g. of water, and with stirring, the mixture was heated. When the temperature reached about 50° C., a solution of 200 g. of sucrose, 100 g. of glucose, and 5 g. of carboxymethyl cellulose in 100 g. of water was added, and the mixture was heated to 60 to 65° C. When the mixture was cooled to less than 20° C., a solution of 20 g. of green powder obtained in Example 1 in 60 g. of water and a spice were added, and the mixture was treated with a homogenizer. The resulting homogeneous solution was sieved with a 120 mesh sieve, and then sterilized at 120° C. for 15 seconds using a plate-type sterilizer. After sterilization, the mixture was frozen to yield 950 g. of ice cream containing green juice powder.

(2) Cosmetic

| | G. |
|---|---|
| Green juice powder | 10 |
| Wheat flour | 100 |
| Methyl cellulose | 1 |
| Perfume | (1) |
| Water | (1) |

[1] Suitable amount.

Ten grams of green juice powder obtained in Example 1, 100 g. of wheat flour, and one gram of methyl cellulose were dissolved in 10 g. of water, and the solution was mixed with some amount of perfume. The mixture was kneaded with a suitable amount of water if desired, and applied to the face.

(3) Health-keeping drug

| | G. |
|---|---|
| Green juice powder | 100 |
| Chinese crude drug [1] | 50 |
| Starch | 25 |
| Lactose | 25 |
| Talc | (2) |
| Magnesium stearate | (2) |
| Ethyl alcohol | (2) |

[1] This drug is the powders of hot water extract of the following:

| | G. |
|---|---|
| Seseleos radix | 1.2 |
| Ligustici radix | 1.2 |
| Ephedrae herba | 1.2 |
| Asiasar radix | 1.2 |
| Scutellariae radix | 2.0 |
| Zingiberis rhizema | 1.2 |
| Cnidii rhizoma | 1.2 |
| Paconiae radix | 1.2 |
| Platycodi radix | 2.0 |
| Glycyrrhizae radix | 2.0 |
| Rhei rhizoma | 1.5 |
| Gypsum | 2.0 |
| Talc | 3.0 |
| Sodium sulfate | 1.5 |
| Atractyloids rhizoma | 2.0 |
| Menthae folium | 1.2 |
| Forsythiae fructus | 1.2 |
| Nepetae herba | 1.2 |

[2] Suitable amount.

One hundred grams of the green juice powders obtained in Example 1, 50 g. of extracted powders of Chinese crude drug, 25 g. of starch, and 25 g. of lactose were uniformly mixed, and kneaded with a proper amount of ethyl alcohol. The kneaded mixture was granulated, and dried in air at 50° C. Suitable amounts of talc and magnesium stearate were mixed, and the mixture was made into tablets each weighing 500 mg. For the prevention and cure of arteriosclerosis, 12 tablets are taken three times a day, four tablets each time.

(4) Buckwheat noodles

| | |
|---|---|
| Green juice powder | 10 g. (1% added). |
| Buckwheat flour | 600 g. |
| Wheat flour | 400 g. |
| Acidic lime phosphate | Suitable amount. |

These ingredients were uniformly mixed, and kneaded with a proper amount of water. The mixture was spread, and cut. The cut noodles of buckwheat were dried with air at 60° C. to yield 1,000 g. of dried buckwheat noodles.

(5) Bread

| | G. |
|---|---|
| Sugar | 6 |
| Whole milk | 6 |
| Table salt | 1.5 |
| Margarine | 5 |
| Yeast | 2.0 |
| Sodium bicarbonate | 0.25 |
| Green juice powder | 0.2 |

These ingredients were dissolved in 65 cc. of water, and 100 g. of wheat flour were kneaded with the solution. The kneaded dough was molded, and maintained for one hour at 37° C., followed by steaming to yield steamed bread having vivid green color.

What is claimed is:

1. A process for producing the powders of green leaves of barley and wheat, which consists essentially of neutralizing a green juice obtained by removing coarse solid matters from a mechanically pulverized product of the green leaves of barley and wheat during or before the full head stage, to a pH 6.5-7.5, and spray-drying or lyophylizing the green juice.

2. The process of claim 1, wherein said barley and wheat is a member selected from the group consisting of barley, wheat, naked barley, oat, and Italian rye grass.

3. A process of claim 1, wherein said neutralizing treatment is performed using a neutralizing agent selected from the group consisting of the carbonates, bicarbonates, hydroxides and amino acid salts of alkali metals and alkaline earth metals.

4. The process of claim 1 wherein the green leaves of barley and wheat are mechanically pulverized during or before the heading initiation stage.

References Cited

UNITED STATES PATENTS

| 2,600,903 | 6/1952 | Miller | 99—28 |
| 3,637,396 | 1/1971 | Hollo et al. | 99—17 |
| 2,400,460 | 5/1946 | Hall | 99—206 |

OTHER REFERENCES

Duckworth et al.: Leaf Protein Concentrates, Chem. Abst., vol. 55, 1961, pp. 21417f–h.

Von Loesecke: Drying and Dehydration of Foods, 1943, pp. 16–18.

Kaur et al.: Leaf Proteins in Nutrition, Chem. Abst., vol. 56, 1962, p. 15897g.

Varga et al.: Experiments to Produce Plant Protein Concentrates, Chem. Abst., vol. 71, 1969, p. 11888n.

MORRIS O. WOLK, Primary Examiner

S. B. DAVIS, Assistant Examiner

U.S. Cl. X.R.

424—195; 426—459